United States Patent
Patel (10) Patent No.: US 11,250,017 B2
(45) Date of Patent: Feb. 15, 2022

(54) OBJECT TRANSFORMATION BASED ON OBJECT GROUPINGS

(71) Applicant: MATCHCRAFT LLC, Santa Monica, CA (US)

(72) Inventor: Dorab R. Patel, Santa Monica, CA (US)

(73) Assignee: MATCHCRAFT LLC, Santa Monica, CA (US)

( * ) Notice: Subject to any disclaimer, the term of this patent is extended or adjusted under 35 U.S.C. 154(b) by 163 days.

(21) Appl. No.: 16/375,371

(22) Filed: Apr. 4, 2019

(65) Prior Publication Data

US 2019/0310993 A1    Oct. 10, 2019

Related U.S. Application Data

(60) Provisional application No. 62/653,773, filed on Apr. 6, 2018.

(51) Int. Cl.
*G06F 16/25* (2019.01)
*G06F 16/28* (2019.01)

(52) U.S. Cl.
CPC .......... *G06F 16/258* (2019.01); *G06F 16/285* (2019.01)

(58) Field of Classification Search
CPC ............................ G06F 16/285; G06F 16/258
USPC ...................................................... 707/999.1
See application file for complete search history.

(56) References Cited

U.S. PATENT DOCUMENTS

| | | |
|---|---|---|
| 5,315,709 A | 5/1994 | Alston, Jr. et al. |
| 9,069,739 B2 | 6/2015 | Shribman et al. |
| 9,395,931 B2 | 7/2016 | Amit et al. |
| 9,852,138 B2 | 12/2017 | Todd et al. |
| 2005/0216917 A1 | 9/2005 | Krishnaswamy et al. |
| 2006/0130008 A1 | 6/2006 | Nguyen et al. |
| 2014/0324795 A1 | 10/2014 | Jiang et al. |
| 2015/0316972 A1 | 11/2015 | Chen et al. |
| 2017/0147540 A1 | 5/2017 | McCormick et al. |
| 2018/0025048 A1 | 1/2018 | Semlani |

(Continued)

OTHER PUBLICATIONS

International Search Report and Written Opinion for International Patent Application No. PCT/US2019/025815, dated Jul. 29, 2019, 10 pages.

(Continued)

*Primary Examiner* — Robert W Beausoliel, Jr.
*Assistant Examiner* — Pedro J Santos
(74) *Attorney, Agent, or Firm* — Withrow & Terranova, PLLC (57) ABSTRACT

Object transformation based on object groupings is disclosed. A plurality of first data objects are accessed, each first data object having a predetermined first format comprising a plurality of first data fields, and each first data object being associated with a particular object group of a plurality of object groups. For each object group, a corresponding transformation policy of a plurality of different transformation policies is selected. The transformation policy that corresponds to the respective object group is applied to the first data objects to generate a plurality of second data objects, each second data object having a predetermined second format comprising a plurality of second data fields, the predetermined second format being different from the predetermined first format.

20 Claims, 6 Drawing Sheets

(56) References Cited

U.S. PATENT DOCUMENTS

2019/0102342 A1* 4/2019 Wang .................... G06F 16/245

OTHER PUBLICATIONS

International Preliminary Report on Patentability for International Patent Application No. PCT/US2019/025815, dated Oct. 15, 2020, 7 pages.

* cited by examiner

OBJECT TRANSFORMATION BASED ON OBJECT GROUPINGS

RELATED APPLICATIONS

This application claims the benefit of U.S. Provisional Application No. 62/653,773, filed on Apr. 6, 2018, entitled "CONVERTING OBJECTS FROM ONE TYPE TO ANOTHER TYPE," the disclosure of which is hereby incorporated herein by reference in its entirety.

BACKGROUND

Electronic systems often operate on a collection of related data. The collection of related data may comprise one or more fields of data, each field corresponding to a different piece of information. Such a collection of related data will be referred to herein as a data object. As an example, a computing device in a retail store may maintain a collection of related data for each of its customers in customer data objects. Each customer data object may include, for example, a name field in which the name of the customer is stored, an address field in which an address of the customer is stored, and a billing information field in which a credit card number is stored. Such a retail store may, over time, create and store millions of customer data objects.

Often, as systems evolve, data objects in a first format need to be transformed into data objects of a different, second format. In the case of the second format being a strict superset of the first format, the transformation may be relatively straightforward. The field values from the data objects in the first format may be simply copied over to corresponding fields in a new object in the second format.

However, this approach works only if the new fields of the second format that do not correspond to fields in the first format can have default (possibly empty) values. Otherwise, some mechanism has to be developed to provide values for the new fields of the second format.

A computing device may maintain thousands, hundreds of thousands, or even millions of data objects. It may be impractical, or impossible, for a human being to manually provide values for data fields in the second format that do not derive their value from data fields in the first format.

SUMMARY

The embodiments relate to an automated and efficient process for object transformation based on object groupings. The embodiments utilize group-based transformation policies to transform groups of data objects in one format into corresponding groups of data objects in a second data format. In some embodiments, data structures that include data values are used in conjunction with data values from a first format object to generate second format objects. Among other advantages, the embodiments provide automatic transformation of large numbers of data objects without human involvement or interaction.

In one embodiment, a method is provided. The method includes accessing, in an electronic memory, by a computing device comprising a processor device, a plurality of first data objects, each first data object having a predetermined first format comprising a plurality of first data fields, and each first data object being associated with a particular object group of a plurality of object groups. The method further includes selecting, for each object group of the plurality of object groups, a corresponding transformation policy of a plurality of different transformation policies, and applying, to each first data object in each respective object group, the transformation policy that corresponds to the respective object group to generate a plurality of second data objects, each second data object having a predetermined second format comprising a plurality of second data fields, the predetermined second format being different from the predetermined first format.

In another embodiment, a computing device is provided. The computing device includes a memory and a processor device coupled to the memory. The processor device is configured to access, in the memory, a plurality of first data objects, each first data object having a predetermined first format comprising a plurality of first data fields, and each first data object being associated with a particular object group of a plurality of object groups. The processor device is further configured to select, for each object group of the plurality of object groups, a corresponding transformation policy of a plurality of different transformation policies, and apply, to each first data object in each respective object group, the transformation policy that corresponds to the respective object group to generate a plurality of second data objects, each second data object having a predetermined second format comprising a plurality of second data fields, the predetermined second format being different from the predetermined first format.

In another embodiment, a computer program product is provided. The computer program product is stored on a non-transitory computer-readable storage medium and includes instructions configured to cause a processor device to access, in an electronic memory, a plurality of first data objects, each first data object having a predetermined first format comprising a plurality of first data fields, and each first data object being associated with a particular object group of a plurality of object groups. The instructions are further configured to cause the processor device to select, for each object group of the plurality of object groups, a corresponding transformation policy of a plurality of different transformation policies. The instructions are further configured to cause the processor device to apply, to each first data object in each respective object group, the transformation policy that corresponds to the respective object group to generate a plurality of second data objects, each second data object having a predetermined second format comprising a plurality of second data fields, the predetermined second format being different from the predetermined first format.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps, and indeed, in some examples some of the steps may be performed in parallel with one another. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

The embodiments relate to an automated and efficient process for object transformation based on object groupings. The embodiments utilize group-based transformation policies to transform groups of data objects in one format into corresponding groups of data objects in a second data format. In some embodiments, data structures that include data values are used in conjunction with data values from a first format object to generate second format objects. Among other advantages, the embodiments provide automatic transformation of large numbers of data objects without human involvement or interaction.

Figure 1:
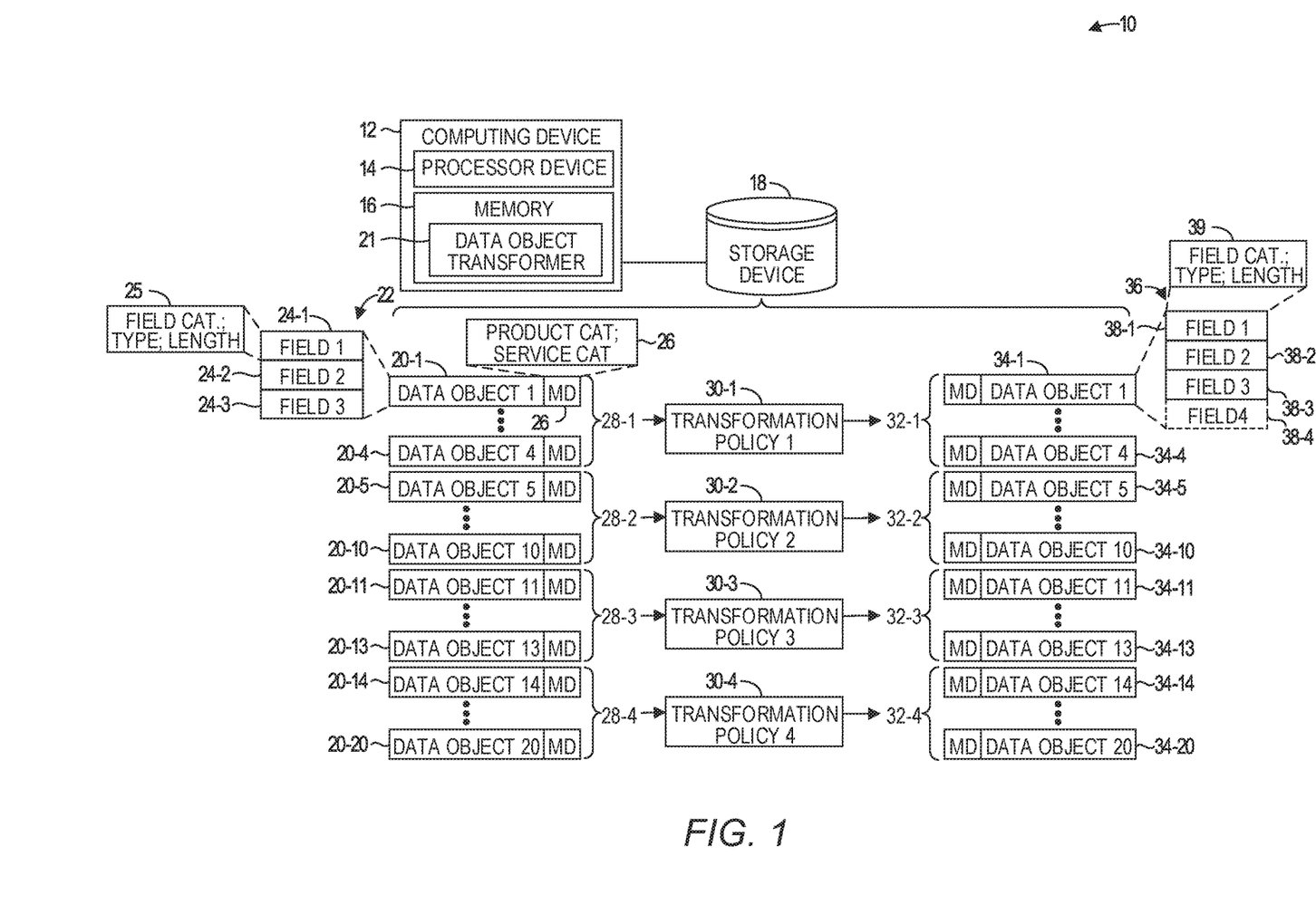
FIG. 1 is a block diagram of an environment in which embodiments may be practiced.

FIG. 1 is a block diagram of an environment 10 in which embodiments may be practiced. The environment 10 includes a computing device 12 that operates with a processor device 14 that is coupled to a memory 16. The computing device 12 includes, or is communicatively coupled to, a storage device 18. The term "electronic memory" as used herein encompasses either or both transitory random access memory, such as the memory 16, and long-term storage memory, such as the storage device 18. The storage device 18 includes a plurality of first data objects 20-1-20-20 (generally, first data objects 20). While for purposes of illustration and simplicity only twenty first data objects 20 are illustrated, in practice, there may be thousands, hundreds of thousands, or millions of first data objects 20.

The embodiments may be implemented, at least in part, via a data object transformer 21. Because the data object transformer 21 is a component of the computing device 12, functionality implemented by the data object transformer 21 may be attributed to the computing device 12 generally. Moreover, in examples where the data object transformer 21 comprises software instructions that program the processor device 14 to carry out functionality discussed herein, functionality implemented by the data object transformer 21 may be attributed herein to the processor device 14.

The first data objects 20 have a predetermined first format 22 that comprises a plurality of first data fields 24-1-24-3 (generally, first data fields 24). Each first data field 24 may have associated attributes 25 that describe a type of data that may be contained in the respective first data field 24. For example, the first data field 24-1 may have a field category attribute that indicates the first data field 24-1 contains data that describes a heading. The first data field 24-1 may also have a type attribute that indicates the type of data is alphanumeric (as opposed to binary, integer, floating point, or the like). The first data field 24-1 may also have a length attribute that identifies a maximum size of the first data field 24-1 in terms of the maximum possible number of alphanumeric characters that can be stored in the first data field 24-1.

Each first data object 20 may also have associated metadata 26. The associated metadata 26 may be stored in conjunction with the corresponding first data object 20, or may be stored apart from the corresponding first data object 20. The first data objects 20 are grouped into a plurality of object groups 28-1-28-4 (generally, object groups 28) based on some criterion or criteria. The criterion or criteria used to establish the object groups 28 may be, for example, based on the content of the first data objects 20 themselves, based on information contained in the metadata 26, or based on any other information.

A different transformation policy 30-1-30-4 (generally, transformation policies 30) is applied to each object group 28 of first data objects 20 to transform the first data objects 20 into corresponding object groups 32-1-32-4 of second data objects 34-1-34-20 (generally, second data objects 34). The second data objects 34 have a predetermined second format 36 that comprises a plurality of second data fields 38-1-38-3, or 38-1-38-4 (generally, second data fields 38). Each second data field 38 may have associated attributes 39 that describe a type of data that may be contained in the respective second data field 38. At least one second data field 38 in the second data objects 34 does not correspond to a first data field 24 in the first data objects 20. The term "correspondence" in this context refers to the existence of a second data field 38 in a second data object 34 for which there is no first data field 24 in a first data object 20 that can be simply copied into the second data field 38. The lack of correspondence may arise due to any of a number of different factors. For example, the second data objects 34 may have a same number of second data fields 38 as the number of first data fields 24 in the first data objects 20, but one or more second data fields 38 may have different attributes 39, such that there is no corresponding one or more first data fields 24 in the first data objects 20. Additionally or alternatively, the second data objects 34 may have a number M second data fields 38 and the first data objects 20 may have a number N first data fields 24, wherein M is greater than N, and thus the second data objects 34 have a greater number of second data fields 38 than the number of first data fields 24 in the first data objects 20.

Details of example transformation policies 30 are discussed in greater detail below; however, in general, the transformation policies comprise an algorithm, and optionally external data, that is used to transform an object group 28 of first data objects 20 into an object group 32 of second data objects 34, and that transforms such first data objects 20 differently from the way other transformation policies 30 transform corresponding object groups 28 of first data objects 20 into object groups 32 of second data objects 34. In essence, the embodiments, by applying a plurality of different transformation policies 30 to different object groups 28 of first data objects 20, facilitate a highly efficient and automated transformation of large numbers of first data objects 20 into corresponding second data objects 34, and yet can facilitate the introduction of unique but context accurate values for new second data fields 38 in the second data objects 34 that do not correspond to a first data field 24 in the first data objects 20.

Figure 2:
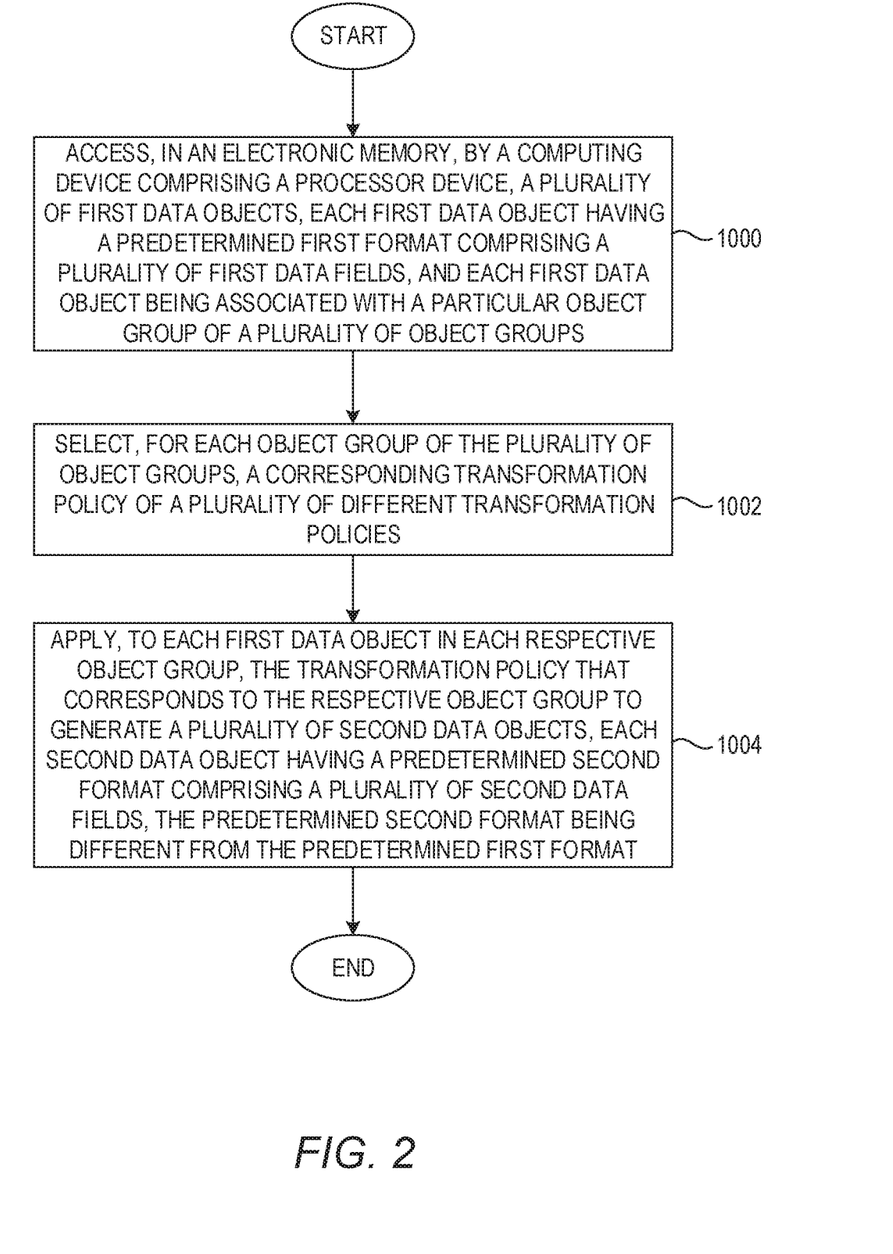
FIG. 2 is a flowchart of a method for object transformation based on object groupings according to one embodiment.

FIG. 2 is a flowchart of a method for object transformation based on object groupings according to one embodiment. FIG. 2 will be discussed in conjunction with FIG. 1. The computing device 12 accesses the plurality of first data objects 20-1-20-20 in the memory 16, or the storage device 18. Each first data object 20-1-20-20 has the predetermined first format 22 comprising the plurality of first data fields 24-1-24-3, and each of the first data objects 20-1-20-20 are grouped into one of the plurality of object groups 28-1-28-4. It is noted that the grouping of each first data object 20-1-20-20 into one of the plurality of object groups 28-1-28-4 may be done manually, or by the computing device 12 based on one or more criteria (FIG. 2, block 1000). The computing device 12 selects, for each object group 28 of the plurality of object groups 28-1-28-4, a corresponding transformation policy 30 of the plurality of different transformation policies 30-1-30-4 (FIG. 2, block 1002). The computing device 12 applies, to each first data object 20 in each respective object group 28, the transformation policy 30 that corresponds to the respective object group 28 to generate the plurality of second data objects 34-1-34-20, each second data object 34 having the predetermined second format 36 comprising the plurality of second data fields 38-1-38-3 (or 38-1-38-4), the predetermined second format 36 being different from the predetermined first format 22 (FIG. 2, block 1004).

Figure 3:
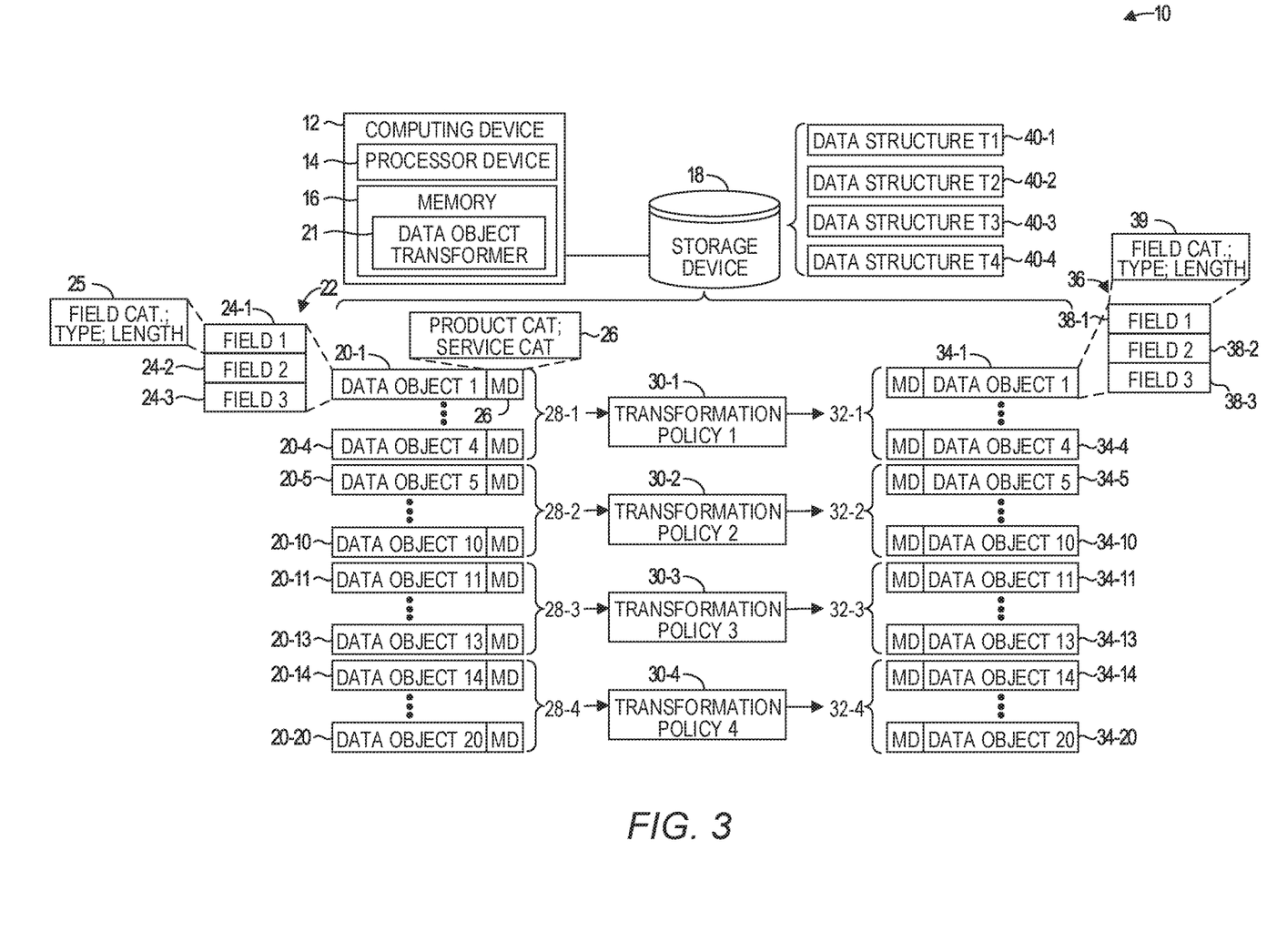
FIG. 3 is a block diagram of the environment illustrated in FIG. 1 according to another embodiment.

FIG. 3 is a block diagram of the environment 10 illustrated in FIG. 1 according to another embodiment. In this embodiment, the first data objects 20-1-20-20 are to be transformed into the plurality of second data objects 34-1-34-20, as discussed above with regard to FIG. 1. In this embodiment, it will be assumed that the second data objects 34 will comprise three second data fields 38-1-38-3, and that there is a correspondence between the first data field 24-1 of a first data object 20 and the second data field 38-1 of the second data object 34 into which the first data object 20 will be transformed, and a correspondence between the first data fields 24-2 and 24-3 of the first data object 20 and the second data field 38-3 of the second data object 34, but that the second data field 38-2 of the second data object 34 has no correspondence with any first data field 24-1-24-3 of the first data object 20. Further, it will be assumed that it is not desired that the second data field 38-2 be empty (i.e., have a null value). In this example, the second data field 38-2 has associated attributes 39 that identify the second data field 38-2 as containing alphanumeric characters that contains a message and has a maximum length of 30 characters.

Data structures 40-1-40-4 are then generated for each object group 28-1-28-4. For simplicity, assume that the data structure 40-1 corresponds to the object group 28-1, the data structure 40-2 corresponds to the object group 28-2, the data structure 40-3 corresponds to the object group 28-3, and the data structure 40-4 corresponds to the object group 28-4. In this example, the first data objects 20-1-20-20 are grouped into the object groups 28-1-28-4 based on a category of the first data objects 20-1-20-20 identified in the metadata 26 that corresponds to each of the first data objects 20-1-20-20. Each data structure 40-1-40-4 contains a plurality of entries, each entry comprising a unique alphanumeric message between 1 and 30 characters in length and being appropriate for the particular category associated with the corresponding object group 28-1-28-4. If it is desirable that each second data object 34 in each object group 32 have unique data in the second data field 38-2, then each data structure 40-1-40-4 contains at least as many entries as the number of second data objects 34 that will be generated for the object group 32. The entries in the data structures 40-1-40-4 may be generated manually, or the computing device 12 may generate the entries automatically based on a desired algorithm.

The data object transformer 21 accesses the first data object 20-1 and generates an empty second data object 34-1. The data object transformer 21 copies the data from the first data field 24-1 of the first data object 20-1 to the second data field 38-1 of the second data object 34-1. The data object transformer 21 accesses the data structure 40-1 and selects an entry from the data structure 40-1 based on a selection criterion or criteria. The data object transformer 21 copies the value of the selected entry into the second data field 38-2 of the second data object 34-1. The data object transformer 21 concatenates the data contained in the first data fields 24-2-24-3 of the first data object 20-1, and stores the concatenated data into the second data field 38-3 of the second data object 34-1, and then stores the second data object 34-1 in the storage device 18. The data object transformer 21 repeats this process for each of the first data objects 20-1-20-20 to transform the first data objects 20-1-20-20 into second data objects 34-1-34-20, utilizing a data structure 40-1-40-4 for each second data object 34 based on the object groups 28-1-28-4 of the first data objects 20-1-20-4.

The data object transformer 21 may use any desired selection criterion or criteria for selecting entries from the data structure 40-1. The selection may be completely random, pseudo-random, or may be sequential. The data object transformer 21 may, in some embodiments, access previously generated second data objects 34, analyze content of the second data field 38-2 of such previously generated second data objects 34 and, based on the analysis, select a particular entry of the data structure 40-1.

Figure 4:
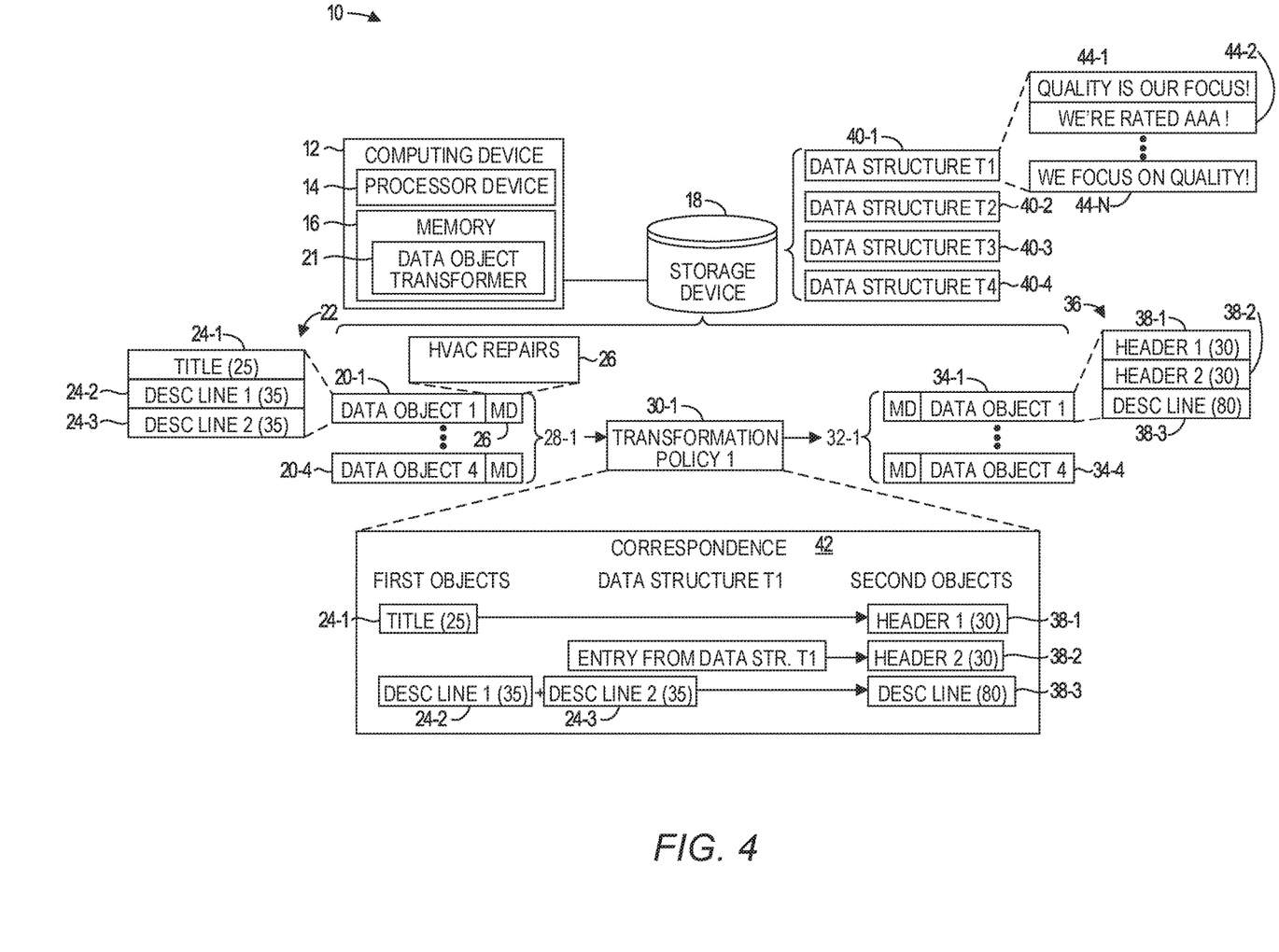
FIGS. 4 and 5 are block diagrams of the environment that illustrate the transformation of data objects in accordance with another embodiment.
Figure 5:
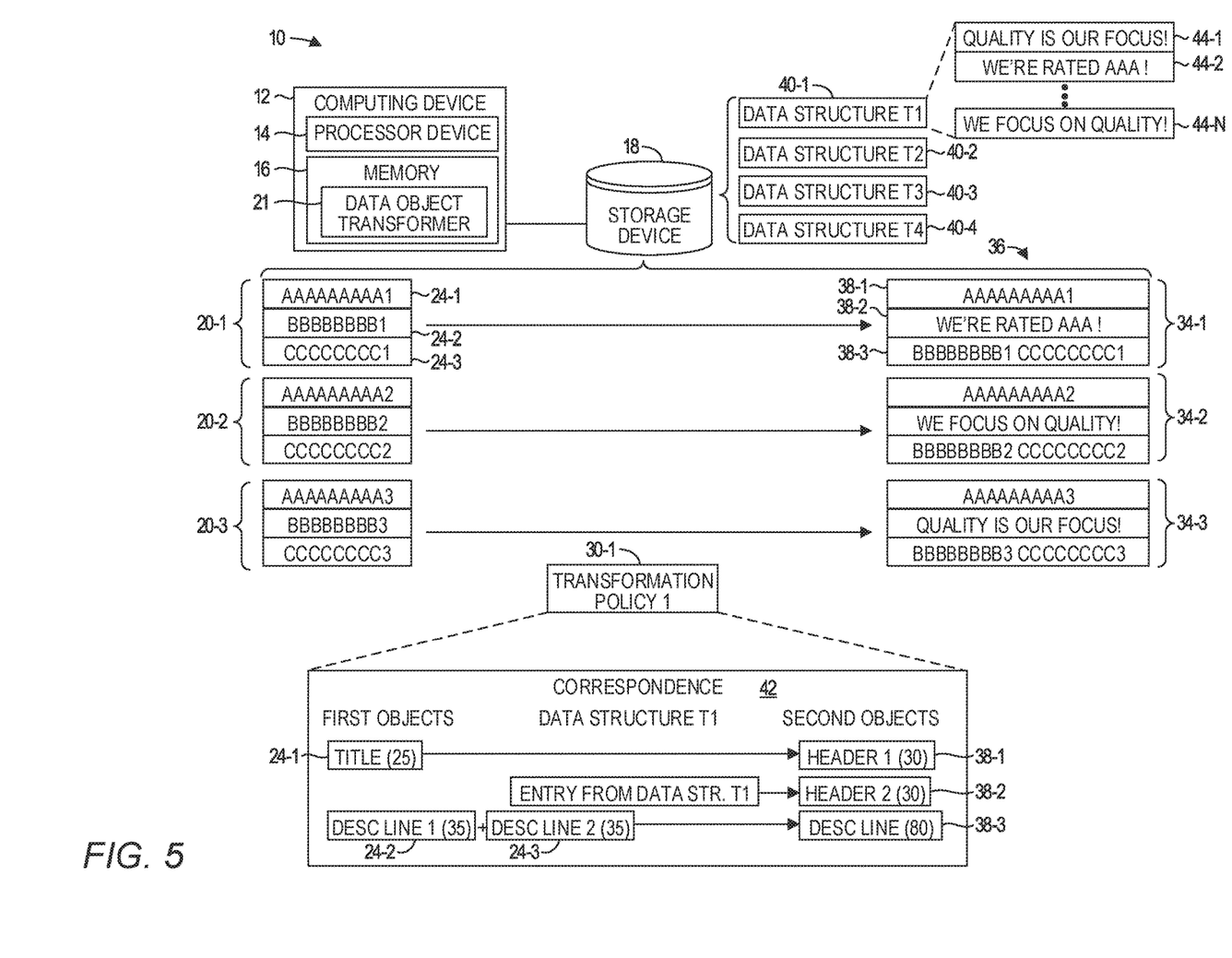

FIGS. 4 and 5 are block diagrams of the environment 10 that illustrate the transformation of data objects in accordance with another embodiment. Referring first to FIG. 4, in this embodiment the first data objects 20-1-20-20 comprise standard text content objects that correspond to different companies' products or services, and which may be accessed by a search engine when conducting a search to provide information to the user of the search engine. The object groups 28-1-28-4 are based on a product or service category identified in the metadata 26 associated with each of the first data objects 20-1-20-20. In this example, each of the first data objects 20-1-20-4 correspond to an HVAC repairs category identified in the metadata 26 associated with each of the first data objects 20-1-20-4.

Each first data object 20-1-20-20 includes three first data fields 24-1, 24-2 and 24-3. The first data field 24-1 has a field category attribute that indicates the first data field 24-1 contains a title, a type attribute that indicates the title is an alphanumeric value, and a length attribute indicating the first data field 24-1 has a maximum length of 25 characters. The first data field 24-2 has a field category attribute that indicates the first data field 24-2 contains a first line of a description, a type attribute that indicates the description is an alphanumeric value, and a length attribute indicating the first data field 24-2 has a maximum length of 35 characters. The first data field 24-3 has a field category attribute that indicates the first data field 24-3 contains a second line of a description, a type attribute that indicates the description is an alphanumeric value, and a length attribute indicating the first data field 24-3 has a maximum length of 35 characters.

Each first data object 20 will be transformed into a corresponding second data object 34. This transformation may occur, by way of non-limiting example, because the owner of the search engine has chosen to change the format of the text content objects. Each second data object 34 includes three second data fields 38-1, 38-2, and 38-3. The second data field 38-1 has a field category attribute that indicates the second data field 38-1 contains a first line of a header, a type attribute that indicates the first line of the header is an alphanumeric value, and a length attribute indicating the first line of the header data has a maximum length of 30 characters. The second data field 38-2 has a field category attribute that indicates the second data field 38-2 contains a second line of the header, a type attribute that indicates the second line of the header is an alphanumeric value, and a length attribute indicating the second line of the header data has a maximum length of 30 characters. The second data field 38-3 has a field category attribute that indicates the second data field 38-3 contains a description, a type attribute that indicates the description is an alphanumeric value, and a length attribute indicating that the description has a maximum length of 80 characters.

A correspondence 42 between the first data fields 24-1-24-3 and the second data fields 38-1-38-3 is established. The correspondence 42 may be established in any desired manner. In some embodiments, the correspondence 42 may be determined manually, and then programmed into the transformation policies 30-1-30-4. The correspondence 42 is utilized by the transformation policy 30-1 to transform the first data objects 20-1-20-4 in the object group 28-1 into the corresponding second data objects 34-1-34-4. The correspondence 42 indicates that the first data field 24-1 corresponds to the second data field 38-1. The correspondence 42 indicates that the second and third data fields 24-2 and 24-3 correspond to the second data field 38-3. There is no correspondence between the second data field 38-2 and any of the first data fields 24-1-24-3. The correspondence 42 identifies, however, a correspondence between the data structure 40-1 and the second data field 38-2. In this example, the data structure 40-1 comprises a plurality of entries 44-1-44-N, each of which contains an alphanumeric value of 30 characters or less, and each of which contains appropriate and unique data for the HVAC repairs category.

While not illustrated due to limitations of space in FIG. 4, each of the transformation policies 30-2-30-4 contain similar correspondences 42, except the transformation policy 30-2 establishes a correspondence between the data structure 40-2 and the second data field 38-2 of the second data objects 34 in the object group 32-2, the transformation policy 30-3 establishes a correspondence between the data structure 40-3 and the second data field 38-2 of the second data objects 34 in the object group 32-3, and the transformation policy 30-4 establishes a correspondence between the data structure 40-4 and the second data field 38-2 of the second data objects 34 in the object group 32-4. Each of the entries in the data structures 40-2-40-4 are appropriate for the particular product or service that is associated with the first data objects 20 in the respective object groups 28-2-28-4.

Referring now to FIG. 5, the transformation of a plurality of first data objects 20-1-20-3 in the object group 28-1 into corresponding second data objects 34 utilizing the transformation policy 30-1 is illustrated. The data object transformer 21, in accordance with the transformation policy 30-1, accesses the first data object 20-1. The data object transformer 21 generates an empty second data object 34-1 that has empty second fields 38-1-38-3. In accordance with the correspondence 42, the data object transformer 21 copies the value of the first data field 24-1 into the second data field 38-1. The data object transformer 21 accesses the data structure 40-1 and, utilizing a criterion or criteria, selects the entry 44-2. The data object transformer 21 copies the entry 44-2 into the second data field 38-2. The data object transformer 21, based on the correspondence 42, accesses the first data fields 24-2 and 24-3 of the first data object 20-1, concatenates the values of the first data fields 24-2 and 24-3 together, and copies the concatenated value into the second data field 38-3. The data object transformer 21 then stores the second data object 34-1 in the storage device 18.

The data object transformer 21 accesses the first data object 20-2. The data object transformer 21 generates an empty second data object 34-2 that has empty fields 38-1-38-3. In accordance with the correspondence 42, the data object transformer 21 copies the value of the first data field 24-1 of the first data object 20-2 into the second data field 38-1 of the second data object 34-2. The data object transformer 21 accesses the data structure 40-1 and, utilizing a criterion or criteria, selects the entry 44-N. The data object transformer 21 copies the entry 44-N into the second data field 38-2. In some embodiments, the data object transformer 21 may access existing second data objects 34 as part of the selection criteria. For example, the data object transformer 21 may keep track of the entries 44 of the data structure 40-1 that have already been utilized in the generation of a second data object 34, and may exclude them from the set of entries 44 that may be used for subsequently generated second data objects 34, to ensure that each second data field 38-2 in each second data object 34 is unique. In some embodiments, after removing each previously used entry 44, the data object transformer 21 may then randomly select an entry 44 among the remaining entries 44.

It will be appreciated that any suitable selection criterion or criteria may be utilized to select an entry 44. If the number of entries 44 is greater than the number of first data objects 20, and uniqueness is desired, the data object transformer 21 may simply access entries 44 successively. In another example, the number of entries 44 may be less than the number of first data objects 20, and the data object transformer 21 may randomly select entries 44, but keep track, for each utilized entry 44, a number of times each respective entry 44 is used to ensure that the entries 44 are used relatively evenly among the second data objects 34.

In another embodiment, the data object transformer 21 may use a "partial overlap" selection criteria, wherein an entry 44 that shares X number of "non trivial" words with any previously used entry 44 will be excluded. Trivial words may be identified, for example, as "the", "or", "a", "an", "that", and the like. As an example, assume that a two-word partial overlap selection criterion is used. If the entry 44-N had been previously used for a second data object 34, the entry 44-1 may be excluded from use for a subsequent second data object 34 because the words "QUALITY" and "FOCUS" in the entry 44-1 overlap with the same words in the entry 44-N.

After the selection of the entry 44-N, the data object transformer 21, based on the correspondence 42, accesses the first data fields 24-2 and 24-3 of the first data object 20-2, concatenates the values of the first data fields 24-2 and 24-3 together, and copies the concatenated value into the second data field 38-3 of the second data object 34-2. The data object transformer 21 then stores the second data object 34-2 in the storage device 18.

The data object transformer 21 follows a similar process to transform the first data object 20-3 into the second data object 34-3. While not illustrated for purposes of brevity, the data object transformer 21 also follows a similar process to transform the first data objects 20-4-20-20 into the second data objects 34-4-34-20, except that the data object transformer 21 uses the data structure 40-2 as the basis for the second data fields 38-2 of the second data objects 34-5-34-10, the data structure 40-3 as the basis for the second data fields 38-2 of the second data objects 34-11-34-13, and the data structure 40-4 as the basis for the second data fields 38-2 of the second data objects 34-14-34-20.

Figure 6:
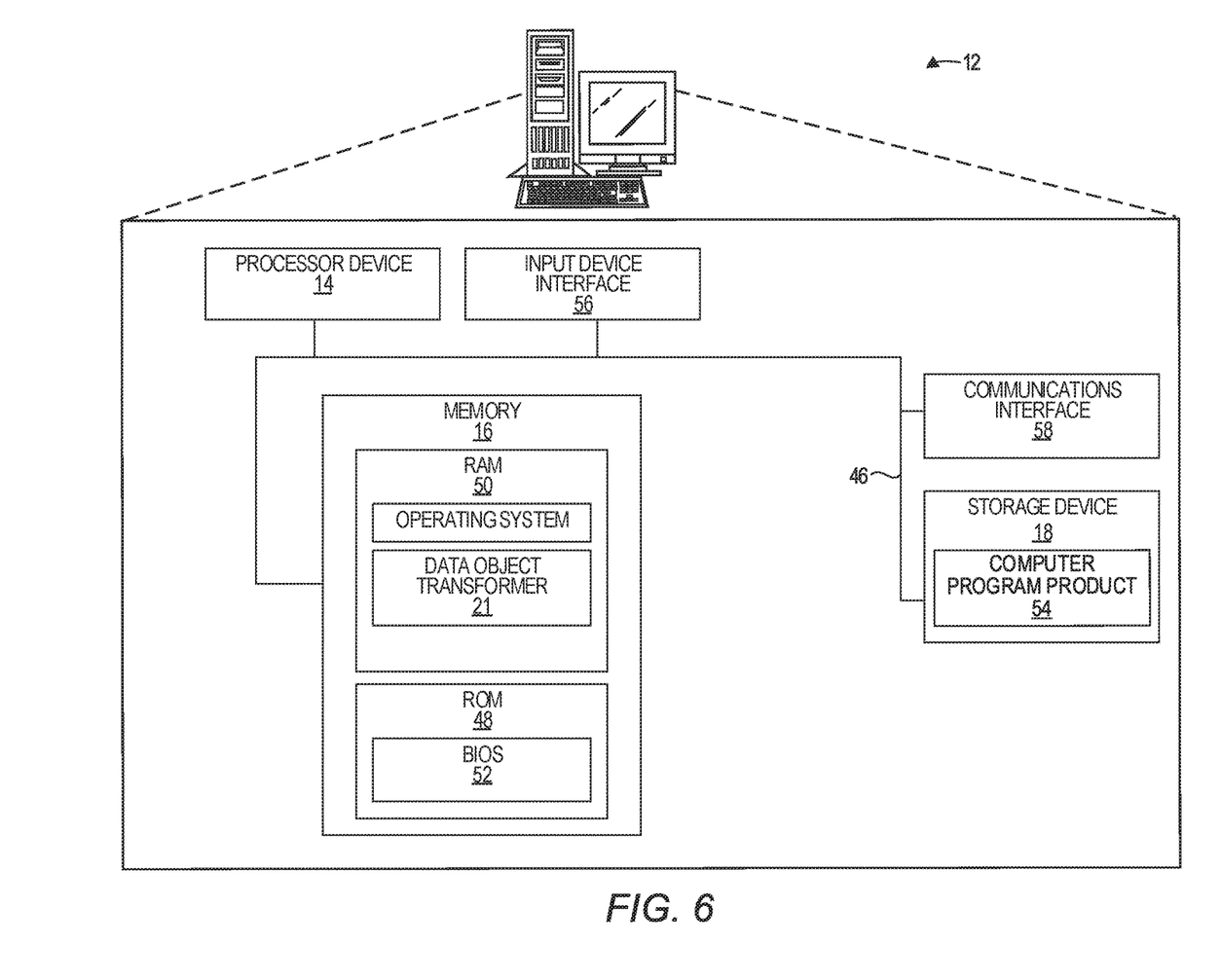
FIG. 6 is a block diagram of a computing device suitable for implementing examples according to one example.

FIG. 6 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 14, the memory 16, and a system bus 46. The system bus 46 provides an interface for system components including, but not limited to, the memory 16 and the processor device 14. The processor device 14 can be any commercially available or proprietary processor.

The system bus 46 may be any of several types of bus structures that may further interconnect to a memory bus (with or without a memory controller), a peripheral bus, and/or a local bus using any of a variety of commercially available bus architectures. The memory 16 may include non-volatile memory 48 (e.g., read-only memory (ROM), erasable programmable read-only memory (EPROM), electrically erasable programmable read-only memory (EEPROM), etc.), and volatile memory 50 (e.g., random-access memory (RAM)). A basic input/output system (BIOS) 52 may be stored in the non-volatile memory 48 and can include the basic routines that help to transfer information between elements within the computing device 12. The volatile memory 50 may also include a high-speed RAM, such as static RAM, for caching data.

The computing device 12 may further include or be coupled to a non-transitory computer-readable storage medium such as the storage device 18, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 18 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 18 and in the volatile memory 50, including an operating system and one or more program modules, such as the data object transformer 21, which may implement the functionality described herein in whole or in part.

All or a portion of the examples may be implemented as a computer program product 54 stored on a transitory or non-transitory computer-usable or computer-readable storage medium, such as the storage device 18, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the data object transformer 21 in the volatile memory 50, may serve as a controller, or control system, for the computing device 12 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 14 through an input device interface 56 that is coupled to the system bus 46 but can be connected by other interfaces such as a parallel port, an Institute of Electrical and Electronic Engineers (IEEE) 1394 serial port, a Universal Serial Bus (USB) port, an IR interface, and the like.

The computing device 12 may also include a communications interface 58, such as an Ethernet transceiver, suitable for communicating with a network as appropriate or desired.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   accessing, in an electronic memory, by a computing device comprising a processor device, a plurality of first data objects, each first data object having a predetermined first format comprising a plurality of first data fields, and each first data object being associated with a particular object group of a plurality of object groups;
   selecting, for each object group of the plurality of object groups, a corresponding transformation policy of a plurality of different transformation policies; and
   applying, to each first data object in each respective object group, the transformation policy that corresponds to the respective object group to generate a plurality of second data objects, each second data object having a predetermined second format comprising a plurality of second data fields, the predetermined second format being different from the predetermined first format.

2. The method of claim 1 further comprising:
   grouping the plurality of first data objects into the plurality of object groups by:
      determining, for each first data object, a category into which the first data object has been categorized; and
      grouping the plurality of first data objects into the plurality of object groups based on the category of each first data object.

3. The method of claim 1 wherein the predetermined first format has a number N different data fields, and the predetermined second format has a number M different data fields, wherein M is greater than N.

4. The method of claim 1 wherein the predetermined first format has a number N different data fields, each data field associated with a corresponding category of information, and wherein the predetermined second format has the number N different data fields, each data field associated with a corresponding category of information, and wherein a data field in the predetermined second format has no corresponding data field in the predetermined first format.

5. The method of claim 1 wherein applying, to each first data object in each respective object group, the transformation policy comprises:
 for each first data object in a first group of first data objects, based on a first transformation policy of the plurality of different transformation policies:
  generating a new second data object having the predetermined second format; and
  for a field in the new second data object that does not correspond to any field in the predetermined first format:
   accessing a first data structure comprising a plurality of entries, each entry comprising a different predetermined value;
   selecting an entry of the first data structure based on a selection criterion;
   inserting a predetermined value of the entry of the first data structure into the field; and
   storing the new second data object.

6. The method of claim 5 wherein the selection criterion comprises a random selection criterion.

7. The method of claim 5 wherein applying, to each first data object in each respective object group, the transformation policy comprises:
 for each first data object in a second group of first data objects, based on a second transformation policy of the plurality of different transformation policies:
  generating a new second data object having the predetermined second format; and
  for a field in the new second data object that does not correspond to any field in the predetermined first format:
   accessing a second data structure comprising a plurality of entries, each entry comprising a different predetermined value, the second data structure being different from the first data structure;
   selecting an entry of the second data structure based on the selection criterion;
   inserting a predetermined value of the entry of the second data structure into the field; and
   storing the new second data object.

8. The method of claim 7 wherein selecting the entry of the second data structure based on the selection criterion further comprises:
 accessing each second data object generated based on the second transformation policy to determine whether the predetermined value of the entry of the second data structure was previously stored in any of the second data objects; and
 based on determining that the predetermined value of the entry of the second data structure was not previously stored in any of the second data objects, inserting the predetermined value of the entry into the field.

9. The method of claim 7 wherein the predetermined value of the entry of the second data structure comprises a plurality of words, and wherein selecting the entry of the second data structure based on the selection criterion comprises:
 accessing each second data object generated based on the second transformation policy to determine whether a predetermined number of the plurality of words was previously used in the corresponding field of any previously stored second data object; and
 based on determining that the predetermined number of the plurality of words was not previously used in the corresponding field of any previously stored second data object, inserting the predetermined value of the entry into the field.

10. The method of claim 1 wherein applying, to each first data object in each respective object group, the transformation policy comprises:
 for each first data object in a first group of first data objects, based on a first transformation policy of the plurality of different transformation policies:
  generating a new second data object having the predetermined second format;
  for a field in the new second data object that does not correspond to any field in the predetermined first format:
   accessing a first data structure comprising a plurality of entries, each entry comprising a different predetermined value;
   determining a set of entries of the first data structure that were not used in any second data object generated previously;
   selecting an entry from the set of entries of the first data structure;
   inserting a predetermined value of the entry of the first data structure into the field; and
   storing the new second data object.

11. The method of claim 10 wherein selecting the entry from the set of entries of the first data structure comprises randomly selecting the entry from the set of entries of the first data structure.

12. A computing device, comprising:
 a memory; and
 a processor device coupled to the memory to:
  access, in the memory, a plurality of first data objects, each first data object having a predetermined first format comprising a plurality of first data fields, and each first data object being associated with a particular object group of a plurality of object groups;
  select, for each object group of the plurality of object groups, a corresponding transformation policy of a plurality of different transformation policies; and
  apply, to each first data object in each respective object group, the transformation policy that corresponds to the respective object group to generate a plurality of second data objects, each second data object having a predetermined second format comprising a plurality of second data fields, the predetermined second format being different from the predetermined first format.

13. The computing device of claim 12 wherein to apply, to each first data object in each respective object group, the transformation policy, the processor device is further configured to:
 for each first data object in a first group of first data objects, based on a first transformation policy of the plurality of different transformation policies:
  generate a new second data object having the predetermined second format; and
  for a field in the new second data object that does not correspond to any field in the predetermined first format:
   access a first data structure comprising a plurality of entries, each entry comprising a different predetermined value;

select an entry of the first data structure based on a selection criterion;
insert a predetermined value of the entry of the first data structure into the field; and
store the new second data object.

14. The computing device of claim 13 wherein the selection criterion comprises a random selection criterion.

15. The computing device of claim 13 wherein to apply, to each first data object in each respective object group, the transformation policy, the processor device is further configured to:
for each first data object in a second group of first data objects, based on a second transformation policy of the plurality of different transformation policies:
generate a new second data object having the predetermined second format; and
for a field in the new second data object that does not correspond to any field in the predetermined first format:
access a second data structure comprising a plurality of entries, each entry comprising a different predetermined value, the second data structure being different from the first data structure;
select an entry of the second data structure based on the selection criterion;
insert a predetermined value of the entry of the second data structure into the field; and
store the new second data object.

16. The computing device of claim 15 wherein to select the entry of the second data structure based on the selection criterion, the processor device is further configured to:
select the entry of the second data structure based on the selection criterion;
access each second data object generated based on the second transformation policy to determine whether the predetermined value of the entry of the second data structure was previously stored in any of the second data objects; and
based on determining that the predetermined value of the entry of the second data structure was not previously stored in any of the second data objects, insert the predetermined value of the entry into the field.

17. A computer program product stored on a non-transitory computer-readable storage medium and including instructions configured to cause a processor device to:
access, in an electronic memory, a plurality of first data objects, each first data object having a predetermined first format comprising a plurality of first data fields, and each first data object being associated with a particular object group of a plurality of object groups;
select, for each object group of the plurality of object groups, a corresponding transformation policy of a plurality of different transformation policies; and
apply, to each first data object in each respective object group, the transformation policy that corresponds to the respective object group to generate a plurality of second data objects, each second data object having a predetermined second format comprising a plurality of second data fields, the predetermined second format being different from the predetermined first format.

18. The computer program product of claim 17 wherein to apply, to each first data object in each respective object group, the transformation policy, the instructions further cause the processor device to:
for each first data object in a first group of first data objects, based on a first transformation policy of the plurality of different transformation policies:
generate a new second data object having the predetermined second format; and
for a field in the new second data object that does not correspond to any field in the predetermined first format:
access a first data structure comprising a plurality of entries, each entry comprising a different predetermined value;
select an entry of the first data structure based on a selection criterion;
insert a predetermined value of the entry of the first data structure into the field; and
store the new second data object.

19. The computer program product of claim 18 wherein the selection criterion comprises a random selection criterion.

20. The computer program product of claim 18 wherein to apply, to each first data object in each respective object group, the transformation policy, the instructions further cause the processor device to:
for each first data object in a second group of first data objects, based on a second transformation policy of the plurality of different transformation policies:
generate a new second data object having the predetermined second format; and
for a field in the new second data object that does not correspond to any field in the predetermined first format:
access a second data structure comprising a plurality of entries, each entry comprising a different predetermined value, the second data structure being different from the first data structure;
select an entry of the second data structure based on the selection criterion;
insert a predetermined value of the entry of the second data structure into the field; and
store the new second data object.

* * * * *